(12) United States Patent  (10) Patent No.: US 8,274,806 B1
Potter et al.  (45) Date of Patent: Sep. 25, 2012

(54) HIGH VOLTAGE GENERATOR WITH MULTIPLE INDUCTIVE COUPLINGS

(75) Inventors: Rudolf H. Potter, Marana, AZ (US);
Richard J Adler, Marana, AZ (US);
James M. Potter, Los Alamos, NM (US)

(73) Assignee: Applied Energetics, Inc, Tucson, AZ (US)

( * ) Notice: Subject to any disclaimer, the term of this patent is extended or adjusted under 35 U.S.C. 154(b) by 858 days.

(21) Appl. No.: 12/133,200

(22) Filed: Jun. 4, 2008

Related U.S. Application Data

(60) Provisional application No. 60/941,738, filed on Jun. 4, 2007.

(51) Int. Cl.
*H02M 7/00* (2006.01)
(52) U.S. Cl. .......................................................... 363/65
(58) Field of Classification Search .................... 363/65, 363/67, 68, 69, 70, 125, 126, 127
See application file for complete search history.

(56) References Cited

U.S. PATENT DOCUMENTS

| | | | | |
|---|---|---|---|---|
| 4,841,429 A | * | 6/1989 | McClanahan et al. | 363/126 |
| 4,866,591 A | * | 9/1989 | Cook et al. | 363/67 |
| 5,267,137 A | * | 11/1993 | Goebel | 363/87 |
| 5,398,182 A | * | 3/1995 | Crosby | 363/89 |
| 5,598,079 A | * | 1/1997 | Robert | 318/780 |
| 5,631,815 A | * | 5/1997 | Cross | 363/68 |
| 5,886,889 A | * | 3/1999 | Escallier | 363/69 |
| 6,445,597 B1 | * | 9/2002 | Boylan et al. | 363/21.06 |
| 6,462,969 B1 | * | 10/2002 | Sato et al. | 363/69 |
| 7,145,785 B2 | * | 12/2006 | Yasumura | 363/16 |
| 7,782,032 B2 | * | 8/2010 | Taufik et al. | 323/272 |

FOREIGN PATENT DOCUMENTS

GB  2045012 A  * 10/1980

* cited by examiner

*Primary Examiner* — Adolf Berhane
(74) *Attorney, Agent, or Firm* — Duft Bornsen & Fishman LLP; Gregory T. Fettig

(57) ABSTRACT

The systems and methods presented herein provide for readily configurable high voltage electrical energy generation. For example, a high voltage electrical energy generation system may include an AC power supply configured with an inductor to transfer AC electrical energy. In this regard, the system may also include a first receptor stage that includes an inductor for inductively coupling to the inductor of the AC power supply to receive the AC electrical energy. Similarly, a second receptor stage may inductively couple to the inductor of the AC power supply as well as to the inductor of the first receptor stage to receive the AC electrical energy, with each receptor being configured as a stackable plate. Each receptor stage may include a rectifier that converts the AC electrical energy to DC electrical energy. The rectifiers may be coupled together via a DC to DC connection provide a DC bias.

20 Claims, 8 Drawing Sheets

HIGH VOLTAGE GENERATOR WITH MULTIPLE INDUCTIVE COUPLINGS

CROSS REFERENCE TO RELATED APPLICATIONS

This patent application is related to, and thus claims the benefit of an earlier filing date from, U.S. Provisional Patent Application No. 60/941,738 filed Jun. 4, 2007, the entire contents of which are incorporated by reference.

BACKGROUND

High voltage electrical energy generation often requires transformers to increase the voltage of an AC (Alternating Current) input. For example, an inductor (e.g., a primary coil) may be used to transfer electrical energy to another inductor (e.g., a secondary coil) by means of inductive coupling. The voltage of the electrical energy may be increased based on a "turns ratio" between the two inductors. That is, by increasing the turns ratio between the two inductors, the voltage of the electrical energy from the primary may be increased.

High voltage electrical energy may have a variety of uses. For example, high voltage electrical energy sources may be used to assist in the excitation of particles as exemplified in particle accelerators. Additionally, high voltage electrical energy may be used for controlled discharges, ion implantation devices, and x-ray devices.

SUMMARY

Systems and methods herein provide for high voltage electrical energy generation. More specifically, the systems and methods herein provide a means for adapting to changing high voltage electoral energy generation requirements. For example, one exemplary electrical energy generator includes a means for providing electrical energy (e.g., an AC power source) and a plurality of electrical energy receptor modules that are inductively coupled to the electrical energy providing means. The electrical energy receptor modules are also inductively coupled to one another. The electrical energy receptor modules receive the electrical energy from the electrical energy providing means and increase a voltage thereof. These receptor modules may increase the voltage of the generated electrical energy through a multiplicative effect of the receptor module inductive couplings as they relay the electrical energy from on receptor module to another. As the high voltage requirements change, receptor modules may be added to further increase the overall output voltage. Alternatively, receptor modules may be removed when high voltage requirements decrease.

In one embodiment, electrical energy generator includes two or more receptor modules that are operable to maintain a predetermined voltage level at a predetermined frequency of the input electrical energy. A first pair of the two or more electrical energy receptor modules may have a first coefficient of coupling. A second pair of the two or more electrical energy receptor modules may have a second coefficient of coupling that is substantially the same as the first coefficient of coupling.

Each of the two or more electrical energy receptor modules may include a circular configuration. For example, each of the two or more electrical energy receptor modules may be configured as circular plates that are physically connected to one another by way of a substantially nonconductive fastening means, such as PVC or plastic screws. For example, the circular plate configuration may provide for the selectable adjustment of the output electrical energy via the addition or removal of electrical energy receptor modules.

Each of the electrical energy receptor modules may include a rectifier for providing DC. The electrical energy generator may be configured for providing greater than about 100 kV DC. The means for providing electrical energy may be configured for generating a sinusoidal waveform, such as AC electrical energy. Alternatively, the means for providing electrical energy may include a filter and/or a digital switch for receiving the sinusoidal waveform and outputting a square wave.

In another embodiment, a method for configuring an electrical energy generator includes determining a voltage for electrical energy to be provided and configuring a plurality of electrical energy receptors to cooperatively provide the voltage for the electrical energy. Each receptor provides a portion of the overall voltage is inductively coupled to one another.

Configuring a plurality of electrical energy receptors may include configuring a capacitance value for each receptor. For example, configuring a capacitance value for each of the receptors may include determining mutual inductance values for the electrical energy receptors. Alternatively or additionally, configuring a capacitance value for each of the electrical energy receptors further may include processing a plurality of matrix coefficients. For example, processing a plurality of matrix coefficients may include performing a matrix operation according to the following equation:

$$C_v = v_{cd}^{-1} M^{-1} \frac{1}{\omega^2} v_c,$$

wherein $C_v$ is a diagonal matrix of capacitor coefficients of the electrical energy receptors, M is a square matrix of mutual inductances of the electrical energy receptors, $\omega$ is the frequency of an input signal, $v_c$ is an Eigen vector of instantaneous voltages across the capacitors, and $v_{cd}$ is a diagonal matrix of the elements of the vector $v_c$.

The method may further include rectifying AC electrical energy to provide DC electrical energy. In this regard, rectifying the AC electrical energy may include staging rectification of the AC electrical energy with a plurality of rectifier stages. The method may further include providing the DC electrical energy from a first electrical energy receptor to a second electrical energy receptor, a third electrical energy receptor, etc.

Configuring the plurality of electrical energy receptors may include providing a plurality of inductor plates in a stacked configuration. For example, providing the plurality of inductor plates in a stacked configuration may include fastening the inductor plates with a plurality of relatively nonconductive screws (e.g., PVC or plastic screws).

Configuring the plurality of electrical energy receptors may include providing a rectifier module with each electrical energy receptor. In this regard, each rectifier module may convert the AC electrical energy to DC electrical energy having a voltage that is a multiple of the AC electrical energy.

In another embodiment, an electrical energy generator may include an AC power supply configured with an inductor to transfer AC electrical energy. A first receptor stage includes an inductor for inductively coupling to the inductor of the AC power supply to receive the AC electrical energy. The first receptor stage further includes a rectifier that converts the AC electrical energy to DC electrical energy. The generator also includes a second receptor stage that includes an inductor for inductively coupling to the inductor of the AC power supply and to the inductor of the first receptor stage to receive the AC electrical energy. The second receptor stage further includes a rectifier that converts the AC electrical energy to DC electrical energy and wherein the rectifier of the second stage is coupled to the rectifier of the first receptor stage.

The rectifier of the first receptor stage may be coupled to the rectifier of the second stage by way of a series electrical connection or a parallel electrical connection. The generator may further include a third or more receptor stages that include an inductor for inductively coupling to the inductors of the AC power supply, the first receptor stage, and the second receptor stage. The third receptor stage may include a rectifier coupled to the rectifier of the second receptor stage. The rectifier of the third receptor stage may convert the AC electrical energy to DC electrical energy for external use. The DC electrical energy has a voltage greater than about 100 kV. For example, the first receptor stage and the second receptor stage may cooperatively maintain the 100 kV or more across a predetermined frequency spectrum of the AC electrical energy.

In another embodiment, a method for providing electrical energy includes providing AC electrical energy and converting the AC electrical energy to a first DC electrical energy using a first electrical energy receptor. The method further includes providing the first DC electrical energy to a second electrical energy receptor and converting the AC electrical energy to a second DC electrical energy using the second to electrical energy receptor. The method also includes providing a third DC electrical energy based on the first and the second DC electrical energies.

Converting the AC electrical energy to a first DC electrical energy may include staging AC to DC electrical conversion using a plurality of rectifiers. The rectifiers may be configured in series or in parallel. The rectifiers may include voltage multipliers.

The first electrical energy receptor and the second electrical energy receptor may be coupled together via a DC to DC coupling. The first electrical energy receptor and the second electrical energy receptor may be coupled together via an inductive coupling. The first electrical energy receptor and the second electrical energy receptor may receive the AC electrical energy via an inductive coupling. The method may further include providing a periodic inductive coupling with the first and the second electrical energy receptors.

Providing the third DC electrical energy may include maintaining a relatively single voltage for the third DC electrical energy across a plurality of frequencies for the AC electrical energy. For example, maintaining a relatively single voltage for the third DC electrical energy may include computing capacitor values for the first and the second electrical energy receptors based on: a frequency of the AC; inductor values of the first and the second electrical energy receptors; a voltage of the AC electrical energy; or a combination thereof.

BRIEF DESCRIPTION OF THE DRAWINGS

Exemplary embodiments are illustrated in referenced figures of the drawings. It is intended that the embodiments and figures disclosed herein be considered illustrative rather than limiting.

DETAILED DESCRIPTION OF THE DRAWINGS

Reference will now be made to the accompanying drawings, which assist in illustrating the various pertinent features of the present invention. Although the present invention will now be described primarily in conjunction with a high voltage electrical energy system, it should be expressly understood that the present invention may be applicable various applications that require high voltage electrical energy generation, such as particle accelerators and X-ray devices. In this regard, the following description of a high voltage electrical energy is presented for purposes of illustration and description. Furthermore, the description is not intended to limit the invention to the form disclosed herein. Consequently, variations and modifications commensurate with the following teachings, and skill and knowledge of the relevant art, are within the scope of the present invention. The embodiments described herein are further intended to explain modes known of practicing the invention and to enable others skilled in the art to utilize the invention in such, or other embodiments and with various modifications required by the particular application (s) or use(s) of the present invention.

Figure 1:
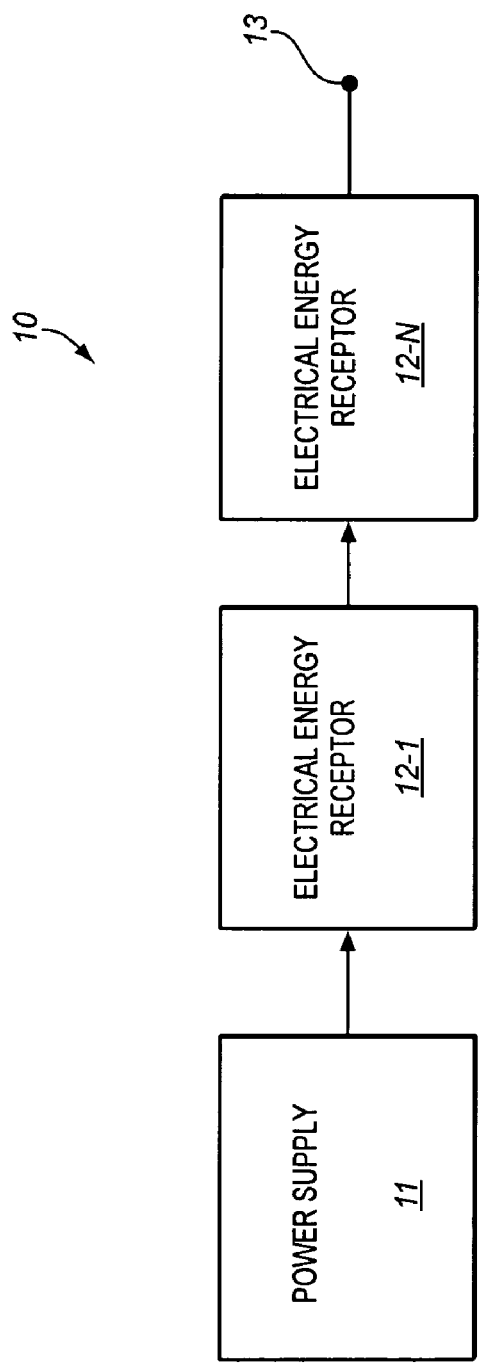
FIG. 1 illustrates a block diagram of an exemplary high voltage electrical energy system.

FIG. 1 illustrates a block diagram of a system 10 for generating high voltage electrical energy. In this embodiment, the system 10 is configured with a power supply 11, the voltage output of which is increased by the electrical energy receptors 12-1 . . . N (wherein N is an integer greater than 1) before being output at node 13. For example, the power supply 11 may be an AC power generator that provides AC electrical energy to the system 10. The electrical energy receptors 12-1 . . . N may boost the voltage of the AC electrical energy prior to delivery from node 13.

In one embodiment, the electrical energy receptors 12-1 . . . N rectify the received AC waveform from the power supply 11 to create a DC electrical energy (i.e., Direct Current). In this regard, each of the receptors 12-1 . . . N may be coupled in series, wherein a subsequent receptor module (e.g., the receptor module 12-N) adds to the voltage of a previous receptor module (e.g., the receptor module 12-1). For example, a first receptor module 12-1 may relay electrical energy to a second receptor module 12-2, which may then relay to a third receptor module 12-3, and so on. The receptor modules 12-1 . . . N may also be inductively coupled to one another as well as to the power supply 11. An example of such inductive coupling is shown and described below in the system 20 of FIG. 2.

Figure 2:
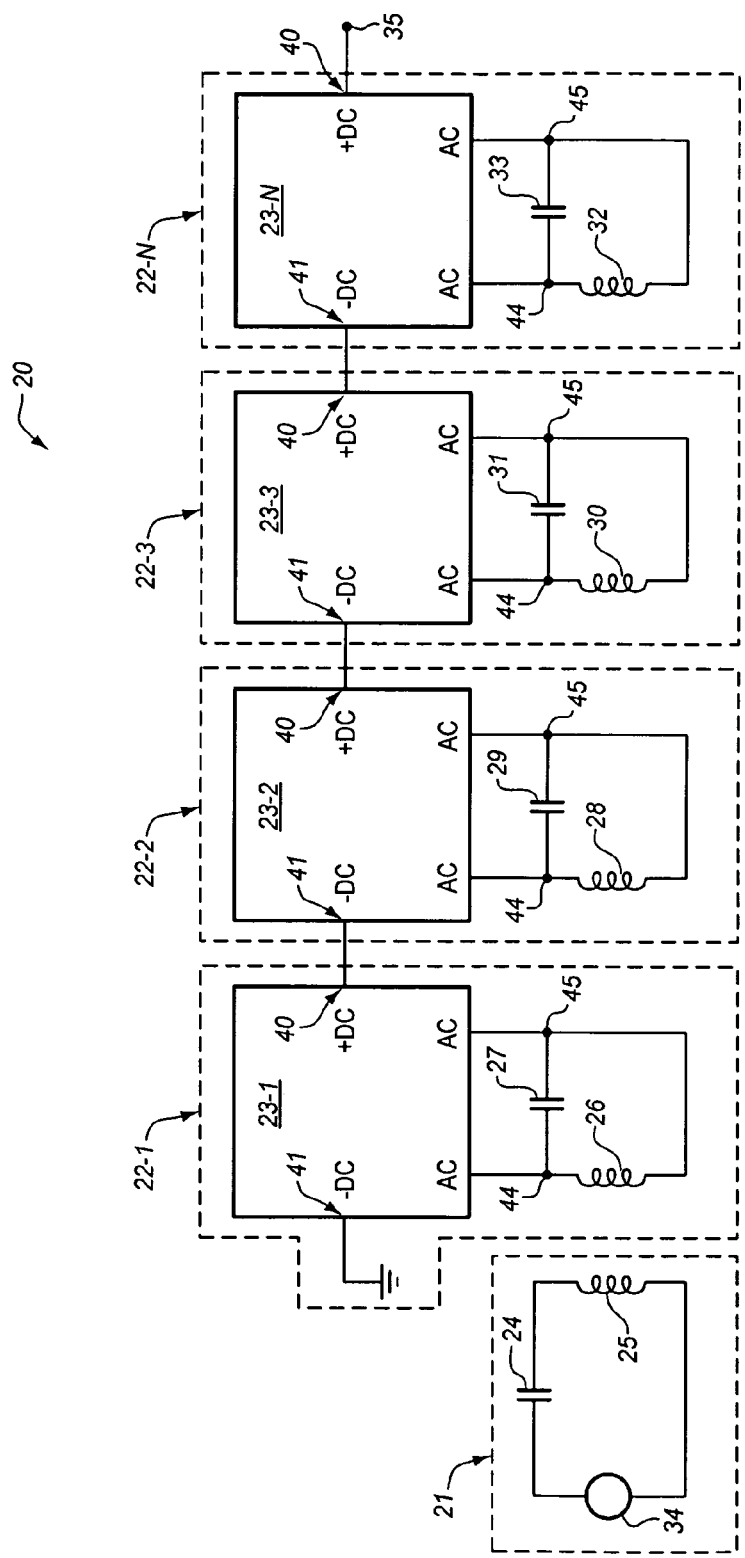
FIG. 2 illustrates a circuit diagram of an exemplary high voltage electrical energy system.

FIG. 2 illustrates a circuit diagram of an exemplary system 20 for generating high voltage electrical energy. In this embodiment, a power supply 21 is configured with an AC power source 34 to provide AC electrical energy. Examples of the power source 34 may include gas/diesel electrical generators or other types of electrical generators. AC electrical current flows from the AC power source 34 through the inductor 25 such that the electrical energy may be transferred to the electrical energy receptor modules 22-1 . . . N. For example, current flow through the inductor 25 may induce current in the inductors 26, 28, 30, and 32 of the receptor modules 22. The power supply 21 may also be configured with a capacitor 24 to balance the electrical energy and thereby provide a relatively flat voltage at node 35, as will be explained in greater detail below.

The electrical energy receptor modules 22-1 . . . N may receive the AC electrical energy and convert it to DC electrical energy. For example, each of the receptor modules $22_{1...N}$ may be configured with a rectifier module 23 that is used to rectify the AC waveform and provide DC electrical energy at a node 40. In this regard, the rectifier modules $23_{1...N}$ may be coupled together at the nodes 40 and 41 such that one rectifier module 23 (e.g., rectifier module 23-1) provides another rectifier module 23 (e.g., rectifier module 23-2) with a base DC electrical energy (e.g., a DC bias). The DC electrical energy of the rectifier modules 23 are thereby summed to provide a DC electrical energy output at a node 35 that is scalable based on the number of rectifier modules within the system 20. In one actual implementation, each receptor module 22 was configured for delivering about 25 kV.

Regarding the inductors 26, 28, 30, and 32, these inductors are inductively coupled to the inductor 25 to receive the AC electrical energy. Additionally, these inductors are inductively coupled to one another. In one embodiment, the physical configuration of the inductors 26, 28, 30, and 32 provides for a periodic inductive coupling. For example, the inductive coupling between inductors 26 and 28 may be the same as the inductive coupling between the inductors 28 and 30. Similarly, the coupling between inductors 26 and 30 may be the same as the coupling between the inductors 28 and 32, and so on.

The inductive coupling between two inductors can be quantified as the ratio of the quantity of flux through both the primary and secondary inductors to the quantity of flux through the primary inductor. This quantity is, by convention, called the coefficient of coupling and is occasionally expressed as a percentage. The mutual inductance, M, between two coils can be expressed as:

$$M = k\sqrt{L_1 L_2}, \tag{Eq. 1}$$

where L1 and L2 are the self inductances of the two coils and k is the coefficient of coupling between them. In practice the coefficient of coupling is determined by the geometry of the two coils and their position relative to one another.

The coefficient of coupling between two inductors can be can be measured by exciting one coil with a sine wave voltage source with a known amplitude $V_1$ and measuring the induced voltage on the second inductor $V_2$. The coefficient of coupling can be calculated in this manner using the following equation:

$$k = \frac{V_2}{V_1} \times \frac{N_1}{N_2}, \tag{Eq. 2}$$

where $N_1$ and $N_2$ are the number of turns on the first and second coils respectively and k is the coefficient of coupling.

The receptor modules 22-1 . . . N are also configured with capacitors 27, 29, 31, and 33. These capacitors 27, 29, 31, and 33 in combination with inductors 26, 28, 30, and 32 may be used to "tune" the voltage produced by each of the receptor modules by adjusting the capacitance of capacitors 27, 29, 31, and 33 to provide nearly equal voltages across each capacitor.

In one mode, the capacitors 27, 29, 31, and 33 are configured to provide relatively equal voltages across each capacitor at a predetermined frequency. An example of this "flat" mode is shown and described below in FIG. 4. Examples of other modes are shown and described below in FIGS. 5-8.

Tuning the system 20 to provide a relatively flat voltage across each capacitor may include the configuration of a matrix algorithm that includes the values of mutual inductance between the inductors 25, 26, 28, 30, and 32. For example, each of the capacitance values for the system 20 may be configured in a diagonal matrix $C_v$ that can be computed according to the following equation:

$$C_v = v_{cd}^{-1} M^{-1} \frac{1}{\omega^2} v_c, \tag{Eq. 3}$$

where $v_c$ is an Eigen vector of instantaneous voltages across the capacitors, $v_{cd}$ is a diagonal matrix made from the elements of the vector $v_c$, M is a square matrix of mutual inductances of the inductors 25, 26, 28, 30, and 32, and $\omega$ is the frequency of the AC power from the power supply 21.

Figure 3:
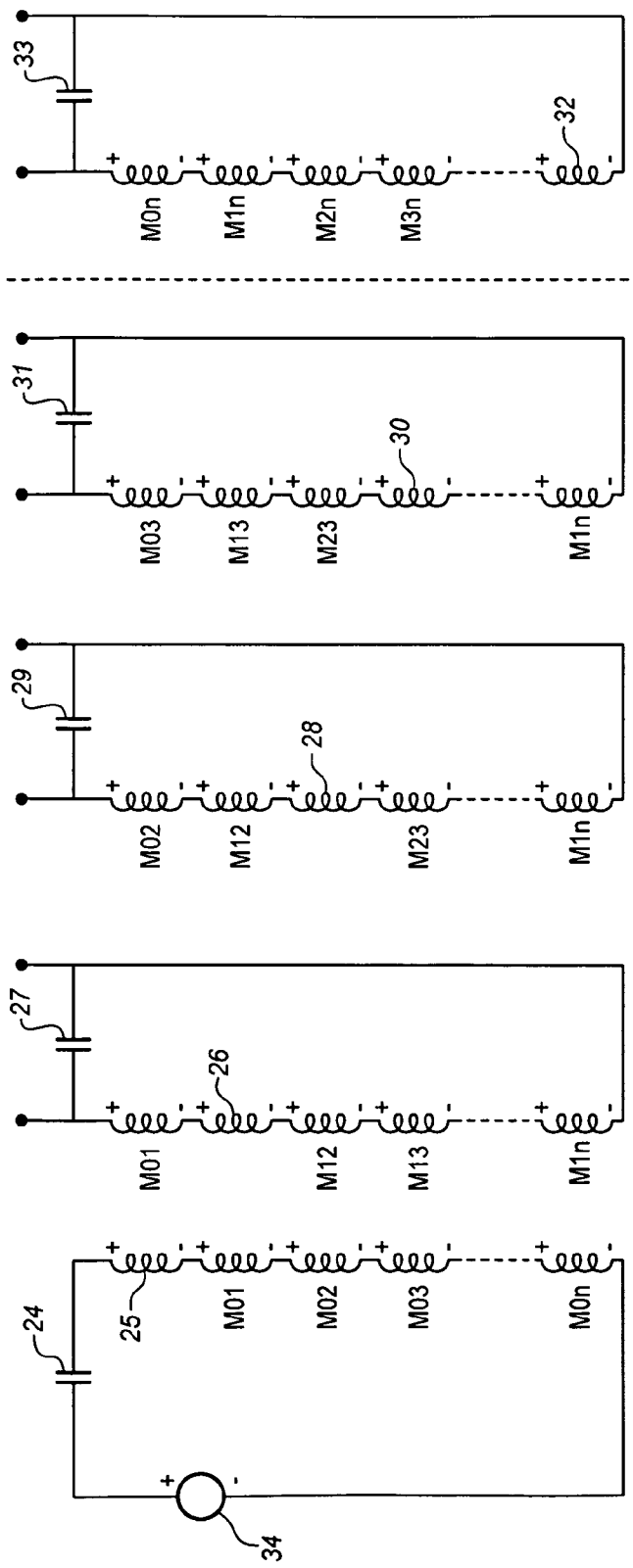
FIG. 3 illustrates mutual inductance modeling in the form of a circuit diagram exemplified by the high voltage electrical energy system of FIG. 2.

Eq. 3 may be computed by first measuring the mutual inductances of the inductors of the system 20 as illustrated in FIG. 3. Once this mutual inductance M is determined, it can be used to predict the behavior of a circuit as follows:

$$V = L_1 \frac{dI_1}{dt} + M \frac{dI_2}{dt}, \tag{Eq. 4}$$

where V is the voltage across the inductor of interest, $dI_1/dt$ is the derivative with respect to time of the current through the primary coil, M is the mutual inductance, and $dI_2/dt$ is the derivative with respect to time of the current through the secondary coil.

Following this convention, the relatively close configuration of the inductors 25 (e.g., the primary coil), 26, 28, 30, and 32 (e.g., secondary coils) yields the mutual inductances of $M_{01} \ldots M_{nn}$, as illustrated in FIG. 3. These mutual inductances can be converted to a mutual inductance matrix as follows:

$$0 = I_0 \frac{1}{j\omega C_0} + I_0 j\omega L_0 + I_1 j\omega M_{01} + \tag{Eq. 5}$$
$$I_1 j\omega M_{02} + I_1 j\omega M_{03} + \ldots + I_n j\omega M_{0n}$$
$$0 = I_1 \frac{1}{j\omega C1} + I_0 j\omega M_{01} + I_1 j\omega L_1 +$$
$$I_2 j\omega M_{12} + I_3 j\omega M_{13} + \ldots + I_n j\omega M_{1n}$$
$$0 = I_2 \frac{1}{j\omega C_2} + I_0 j\omega M_{02} + I_1 j\omega M_{12} +$$
$$I_2 j\omega L_2 + I_3 j\omega M_{23} + \ldots + I_n j\omega M_{2n}$$
$$0 = I_3 \frac{1}{j\omega C_3} + I_0 j\omega M_{03} + I_1 j\omega M_{13} +$$
$$I_2 j\omega M_{23} + I_3 j\omega L_3 + \ldots + I_n j\omega M_{3n}$$
$$0 = I_n \frac{1}{j\omega C_n} + I_0 j\omega M_{0n} + I_1 j\omega M_{1n} +$$
$$I_2 j\omega M_{2n} + I_3 j\omega M_{3n} + \ldots + I_n j\omega Ln,$$

where j is the square root of −1. The elements of Eq. 5 may then be divided by $j\omega$ to provide the following:

$$0 = I_0 \frac{-1}{\omega^2 C_0} + I_0 L_0 + I_1 M_{01} + I_2 M_{02} + I_3 M_{03} + \ldots + I_n M_{0n} \quad \text{(Eq. 6)}$$

$$0 = I_1 \frac{-1}{\omega^2 C_1} + I_0 M_{01} + I_1 L_1 + I_2 M_{12} + I_3 M_{13} + \ldots + I_n M_{1n}$$

$$0 = I_2 \frac{-1}{\omega^2 C_2} + I_0 M_{02} + I_1 M_{12} + I_2 L_2 + I_3 M_{23} + \ldots + I_n M_{2n}$$

$$0 = I_3 \frac{-1}{\omega^2 C_3} + I_0 M_{03} + I_1 M_{13} + I_2 M_{23} + I_3 L_3 + \ldots + I_n M_{3n}$$

$$0 = I_n \frac{-1}{\omega^2 C_n} + I_0 M_{0n} + I_1 M_{1n} + I_2 M_{2n} + I_3 M_{3n} + \ldots + I_n L_n.$$

The elements of Eq. 6 may then be multiplied by $C_j$ to provide the following $$0 = I_0 \frac{-1}{\omega^2} + I_0 C_0 L_0 + I_1 C_0 M_{01} + \quad \text{(Eq. 7)}$$
$$I_2 C_0 M_{02} + I_3 C_0 M_{03} + \ldots + I_n C_0 M_{0n}$$

$$0 = I_1 \frac{-1}{\omega^2} + I_0 C_1 M_{01} + I_1 C_1 L_1 + I_2 C_1 M_{12} +$$
$$I_3 C_1 M_{13} + \ldots + I_n C_1 M_{1n}$$

$$0 = I_2 \frac{-1}{\omega^2} + I_0 C_2 M_{02} + I_1 C_2 M_{12} + I_2 C_2 L_2 +$$
$$I_3 C_2 M_{23} + \ldots + I_n C_2 M_{2n}$$

$$0 = I_3 \frac{-1}{\omega^2} + I_0 C_3 M_{03} + I_1 C_3 M_{13} +$$
$$I_2 C_3 M_{23} + I_3 C_3 L_3 + \ldots + I_n C_3 M_{3n}$$

$$0 = I_n \frac{-1}{\omega^2} + I_0 C_n M_{0n} + I_1 C_n M_{1n} +$$
$$I_2 C_n M_{2n} + I_3 C_n M_{3n} + \ldots + I_n C_n L_n.$$

Grouping the elements of Eq. 7 by $I_j$ provides the following:

$$0 = I_0 \left(C_0 L_0 - \frac{1}{\omega^2}\right) + I_1 C_0 M_{01} + \quad \text{(Eq. 8)}$$
$$I_2 C_0 M_{02} + I_3 C_0 M_{03} + \ldots + I_n C_0 M_{0n}$$

$$0 = I_0 C_1 M_{01} + I_1 \left(C_1 L_1 - \frac{1}{\omega^2}\right) + I_2 C_1 M_{12} +$$
$$I_3 C_1 M_{13} + \ldots + I_n C_1 M_{1n}$$

$$0 = I_0 C_2 M_{02} + I_1 C_2 M_{12} + I_2 \left(C_2 L_2 - \frac{1}{\omega^2}\right) +$$
$$I_3 C_2 M_{23} + \ldots + I_n C_2 M_{2n}$$

$$0 = I_0 C_3 M_{03} + I_1 C_3 M_{13} + I_2 C_3 M_{23} +$$
$$I_3 \left(C_3 L_3 - \frac{1}{\omega^2}\right) + \ldots + I_n C_3 M_{3n}$$

$$0 = I_0 C_n M_{0n} + I_1 C_n M_{1n} + I_2 C_n M_{2n} +$$
$$I_3 C_n M_{3n} + \ldots + I_n \left(C_n L_n - \frac{1}{\omega^2}\right).$$

Eq. 8 may then be converted to matrix notation by letting $M_{nn} = L_n$ and $M_{ij} = M_{ji}$ (wherein i and j are increments) to provide the following:

$$0 = \begin{bmatrix} C_0 & 0 & 0 & 0 & 0 \\ 0 & C_1 & 0 & 0 & 0 \\ 0 & 0 & C_2 & 0 & 0 \\ 0 & 0 & 0 & C_3 & 0 \\ 0 & 0 & 0 & 0 & C_n \end{bmatrix} \cdot \begin{bmatrix} M_{11} & M_{12} & M_{13} & M_{14} & M_{1n} \\ M_{21} & M_{22} & M_{23} & M_{24} & M_{2n} \\ M_{31} & M_{32} & M_{33} & M_{34} & M_{3n} \\ M_{41} & M_{42} & M_{43} & M_{44} & M_{4n} \\ M_{n1} & M_{n2} & M_{n3} & M_{n4} & M_{nn} \end{bmatrix} - \quad \text{(Eq. 9)}$$

$$\begin{bmatrix} 1 & 0 & 0 & 0 & 0 \\ 0 & 1 & 0 & 0 & 0 \\ 0 & 0 & 1 & 0 & 0 \\ 0 & 0 & 0 & 1 & 0 \\ 0 & 0 & 0 & 0 & 1 \end{bmatrix} \frac{1}{\omega^2} \cdot \begin{bmatrix} I_0 \\ I_1 \\ I_2 \\ I_3 \\ I_n \end{bmatrix}$$

which can be arranged as follows:

$$0 = \left(C \cdot M - E \frac{1}{\omega^2}\right) \cdot I, \quad \text{(Eq. 10)}$$

where E is an identity matrix (e.g., so as to not confuse with current I). Via Ohm's law, the current I can be substituted with $j\omega C \cdot v_c$ to provide the following:

$$0 = \left(C \cdot M - E \frac{1}{\omega^2}\right)(j\omega C \cdot v_c). \quad \text{(Eq. 11)}$$

Distributing the elements of Eq. 11 provides the following:

$$0 = C \cdot M \cdot j\omega C \cdot v_c - E \frac{1}{\omega^2} \cdot j\omega C \cdot v_c. \quad \text{(Eq. 12)}$$

Multiplying Eq. 12 by $$\frac{C^{-1}}{j\omega^2}$$

yields the following:

$$0 = M \cdot C \cdot v_c - E \frac{1}{\omega^2} \cdot v_c, \quad \text{(Eq. 13)}$$

from which C can be solved. For example, $$M \cdot C \cdot v_c = E \frac{1}{\omega^2} \cdot v_c \quad \text{(Eq. 14)}$$

$$C \cdot v_c = M^{-1} \cdot E \frac{1}{\omega^2} \cdot v_c. \quad \text{(Eq. 15)}$$

Assuming that C is a diagonal matrix with the $C_v$ being a vector of the diagonal elements representing the capacitor values of the system 20, then $v_{cd}$ is the diagonal matrix made from the elements of $v_c$ (e.g., $C \cdot v_c = v_{cd} \cdot C_v$). Eq. 15 can thereby be configured as follows:

$$v_{cd} \cdot C_v = M^{-1} \cdot \frac{1}{\omega^2} \cdot v_c \quad \text{(Eq. 16)}$$

$$C_v = v_{cd}^{-1} \cdot M^{-1} \cdot \frac{1}{\omega^2} \cdot v_c. \quad \text{(Eq. 3)}$$

Figure 4:
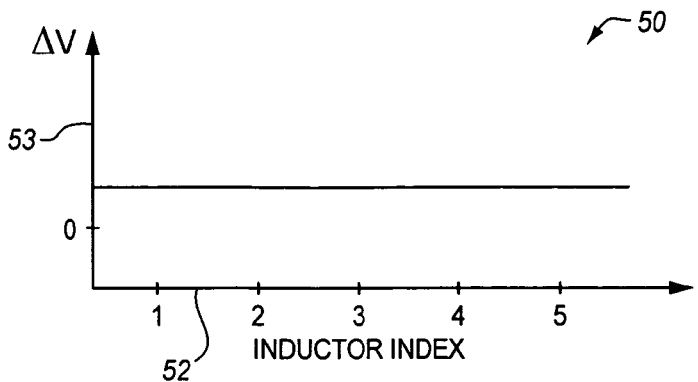
FIGS. 4-7 illustrate various exemplary electrical energy modes of the high voltage electrical energy system.
Figure 5:
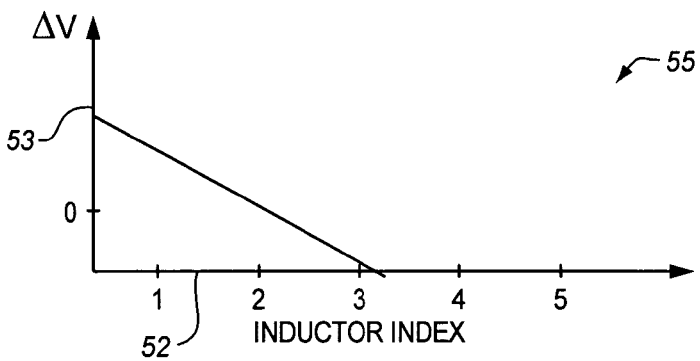
Figure 6:
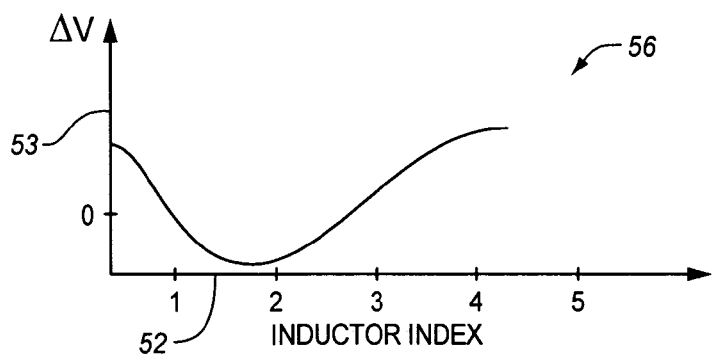
Figure 7:
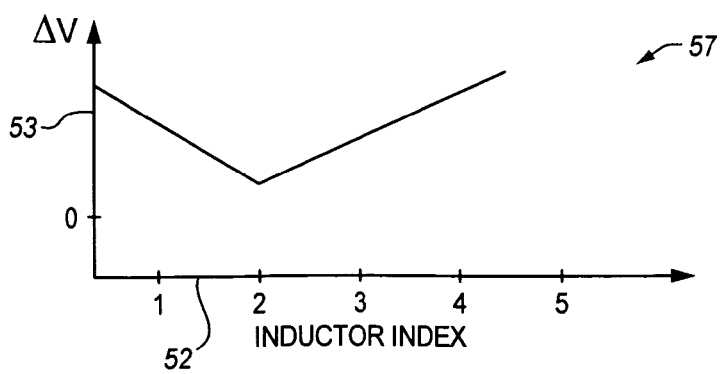

As mentioned above, $v_c$ is an Eigen vector of instantaneous voltages across the capacitors (i.e., that form the diagonal matrix $C_v$). By choosing a flat voltage distribution across the capacitors, the values for the capacitors can be readily solved. For example, assuming that the voltages across capacitors 27, 29, 31, and 33 are equal, $v_c$ can be normalized to generate a unity Eigen vector consisting of ones. From there, the values of $C_v$ can be readily obtained. This flat mode of electrical energy generation is illustrated in FIG. 4. The horizontal axis 52 of FIG. 4, and for that matter the horizontal axes 52 of FIGS. 5 though 7 respectively, reflects the number of the energy receptor modules used in the electrical energy generation. For example, the number "1" on the graphs 50, 55, 56, and 57 represents the receptor module closest to the electrical energy providing means, the number 2 represents the next closest receptor module, etc. The vertical axes 53 of graphs 50, 55, 56, and 57 illustrated in FIGS. 4, 5, 6, and 7, respectively, represent the voltage generated by that receptor module. FIG. 4 thus shows the voltage generated by each receptor module as being equal. FIGS. 5 through 7 are other examples of other possible voltage distributions. While in many cases, the user of the system may generally prefer to have a flat output voltage as shown in FIG. 4 (e.g., equal voltage on each capacitor), there may be instances in which the various modes presented in FIGS. 5-7, as well as other modes, would be desirable.

Although shown and described with respect to the configuration of capacitor values, those skilled in the art should readily recognize that the invention is not intended to be limited to such computations. Rather, as can be seen from the above equations, the capacitor values depend in part upon inductor values. Accordingly, the equations hereinabove can be implemented to compute inductor values based on already determined capacitor values.

Figure 8:
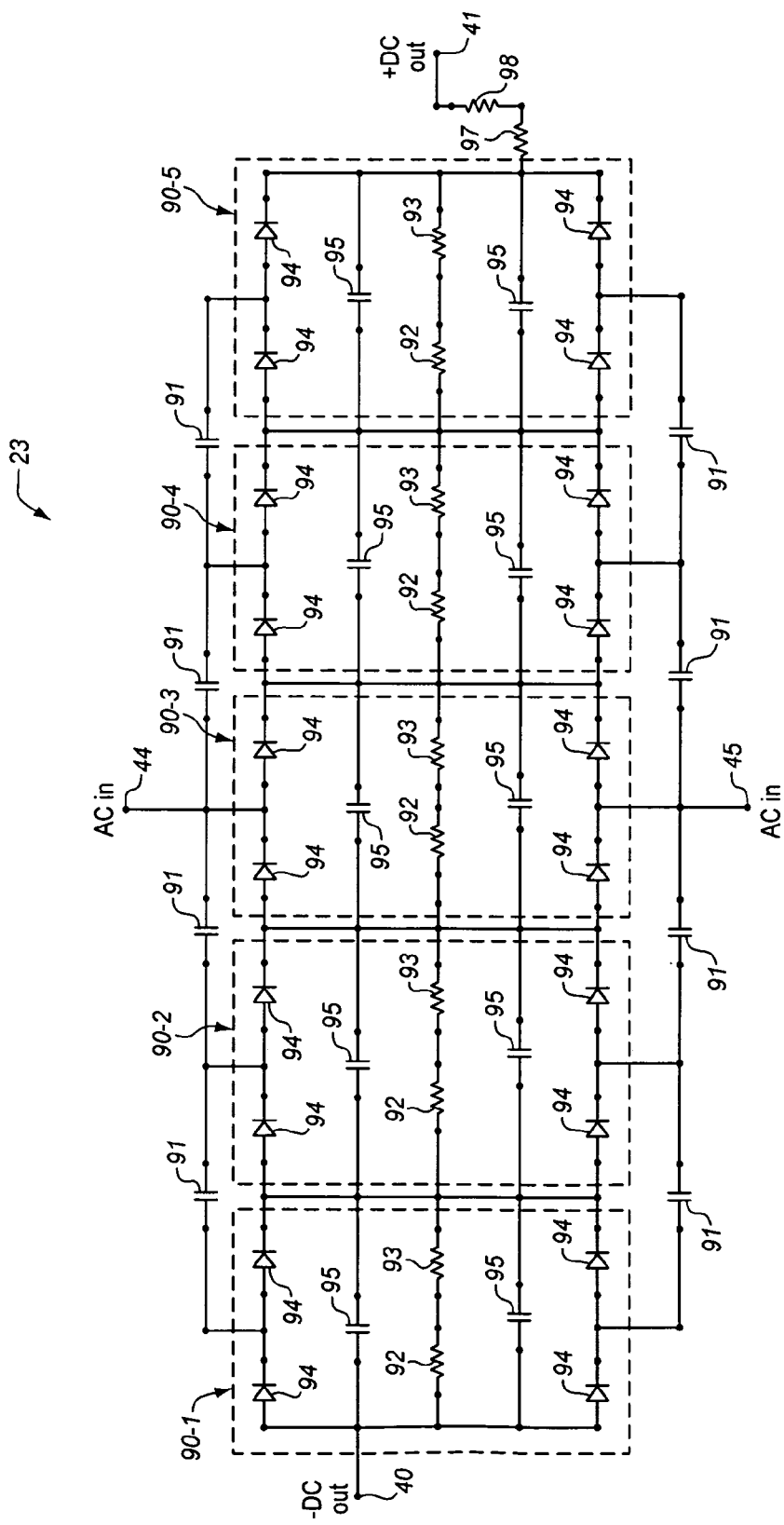
FIG. 8 illustrates a circuit diagram of an exemplary rectifier module for use in a high voltage electrical energy system.

FIG. 8 illustrates a circuit diagram of an exemplary rectifier module 23 for use in a high voltage electrical energy system, such as the system 20 of FIG. 2. In this embodiment, the rectifier module 23 is configured with AC inputs 44 and 45 and DC outputs 40 and 41 as illustrated in FIG. 2. The rectifier module 23 is also configured with five full bridge rectifiers 90, although those skilled in the art should readily recognize that the rectifier module 23 may be configured with more or less than the illustrated number of full bridge rectifiers. Of the five full bridge rectifiers 90, four are "driven" by capacitors 91. These capacitors 91, in essence, operate as DC "blockers" by capacitively isolating the inputs to the rectifiers 90 such that the rectifiers receive AC voltage. The rectifier $90_3$ is driven by the AC input itself as applied to inputs 44 and 45. Each of the rectifiers 90 includes two capacitors 95 and four diodes 94 to rectify the AC input. In one embodiment, the capacitors 91 and 95 are configured as 250 pF capacitors, although other values may be used according to design choice. Resistors 92 and 93 are generally referred to as "bleeder resistors" that distribute voltage across the capacitors 95 as well as discharge the capacitors 95 when the generator is turned off. Resistors 97 and 98 are series resistors to limit current. In one specific embodiment, resistors 92 and 93 are 20 MΩ and resistors 97 and 98 are 2.2 kΩ, although other combinations may be used.

Figure 9:
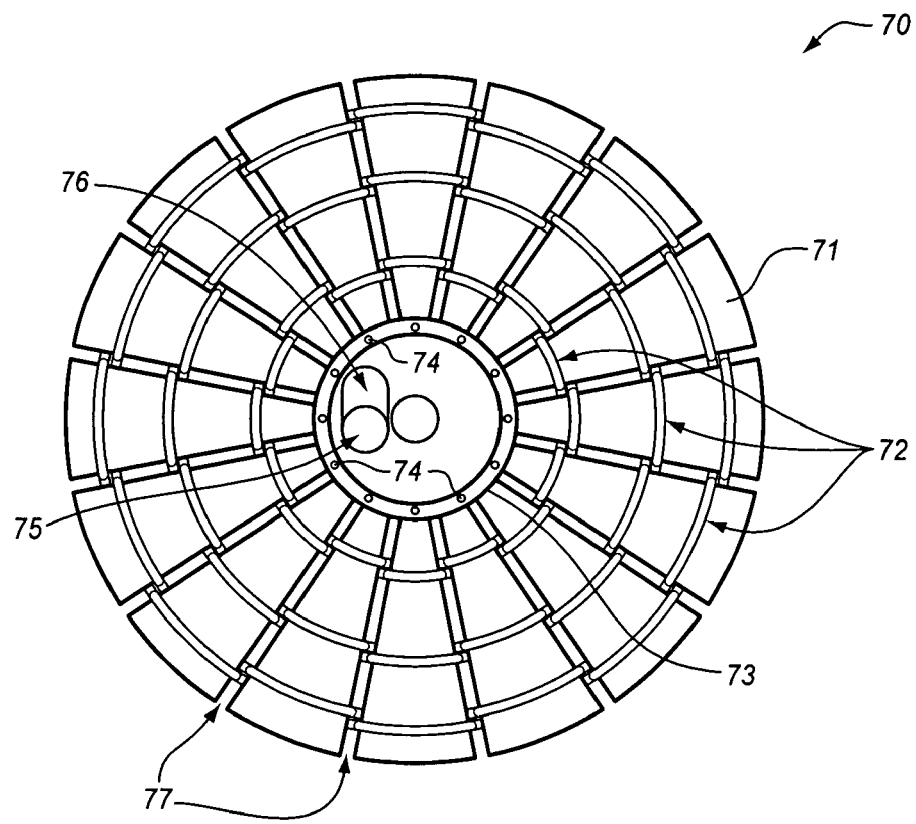
FIGS. 9 and 10 illustrate an exemplary inductor plate of a high voltage electrical energy system.
Figure 10:
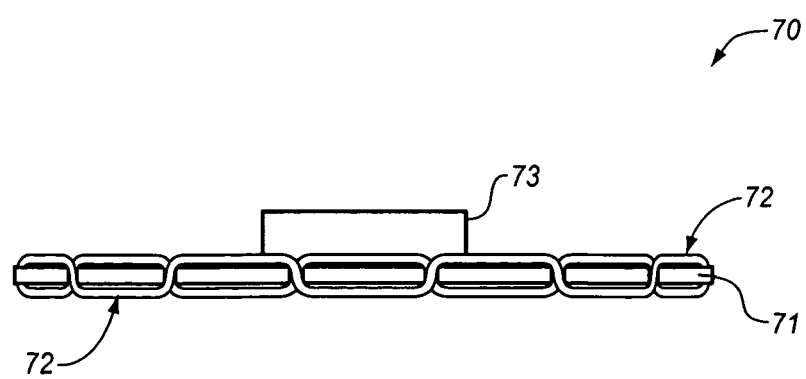

FIGS. 9 and 10 illustrate an exemplary inductor plate 70 of a high voltage electrical energy system. More specifically, the inductor plate 70 may be representative of the inductors 26, 28, 30, and 32 of FIG. 2. In this embodiment, the inductors are configured with a plate 70 having slots 77. In this regard, the inductors 72 are woven about the "tabs" 71 of the plate 70. For example, the inductors 72 may be wires so as to provide a cable that weaves through the slots 77 about the tabs of the plate providing inductor windings in a web-like configuration.

Since the inductors 72 are configured on a relatively flat plate, other inductors may be similarly configured and stacked on the flat plate 70 by means of the connection ring 73. For example, the connection ring 73 may be a PVC or other dielectric material which allows plates to couple together without direct conduction (e.g., arcing or corona). Similarly, the plate 70 may also be configured as some dielectric material such as PVC to prevent corona. The plates may then be stacked upon one another via the connection rings 73 and physically attached to one another via screws, or other fasteners. In this regard, plastic screws may be used to couple the plates 70 via the screw holes 74 within of the connection ring 73. Again, the plastic screws, being dielectric in nature, may prevent corona.

Also shown with the inductor configuration 70 is the rectifier module 75. Generally, the rectifier module 75 is adapted to convert AC input from the inductors 72 to DC electrical energy. The rectifier module 75 may be a full bridge rectifier, such as that of the rectifier module 23 of FIG. 8. The rectifier module 75 may be encapsulated in an insulating material so as to prevent corona.

In regards to the physical configuration of the rectifier module 75, the rectifier module is "seated" within the connection ring 73 so as to not protrude past the upper portion of the connection ring. Given the size of the rectifier module 75, the plates 70 may be advantageously stacked in a compact configuration. Additionally, the rectifier module 75 is seated within the aperture 76 so as to allow for positioning of the rectifier module 75. By moving the rectifier module 75 from one side of the aperture 76 to another side on alternating rings $70_{1...10}$, the rectifier modules 75 can be aligned for a suitable connection.

Figure 11:
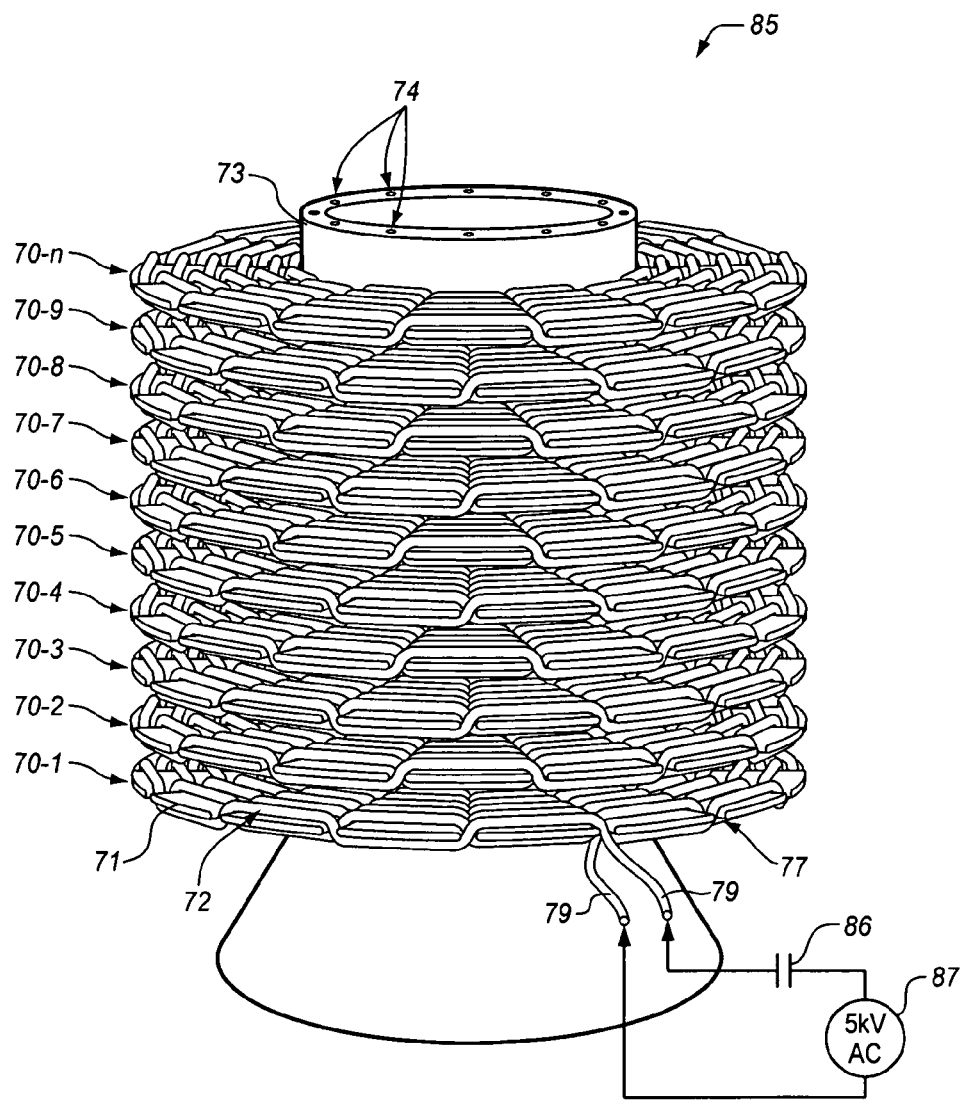
FIG. 11 illustrates an exemplary stacked configuration of inductor plates and multiplier modules used in a high voltage electrical energy system.

FIG. 11 illustrates a stacked configuration of inductor plates 70 and receptor modules 75 used in a high voltage electrical energy system 80 as shown in FIGS. 9 in 10. In this embodiment, the high voltage electrical energy system 85 is configured with 10 stacked inductor plates 70-1 . . . N. With each inductor plate 70 having the capability of generating roughly 25 kV DC of electrical energy, the high voltage electrical energy system 85 may be capable of delivering 250 kV.

For example, the inductor 25 of the power supply 21 of FIG. 2 may be configured to transfer AC electrical energy to the plurality of electrical energy receptors 22. In this regard, the inductor 25 may be configured as a plate 70-1 in similar fashion to the plate 70 and mounted on a stand. That is, the inductor plate 70-1 may have inductors woven about tabs of the plate. The inductor plate 70-1 may also be configured with a connection ring 73 that physically fastens to the inductor plate 70-2. Differing from the inductor plates 70 is the lack of a rectifier module 75. The inductors 72 of the plate 70-1 may instead be coupled via connection 79 to positive and negative sides of a power source 87 (e.g., via capacitor 86) exemplarily illustrated as 5 kV AC and in a manner that is similar to the power source 34 shown in FIG. 2 acting as a primary coil. In this regard, the primary coils (i.e., the inductor plate 70-1) and secondary coils (i.e., the inductor plates 70-2 . . . N) of the electrical energy system 85 may be configured as part of the same general manufacturing process.

However, the invention is not intended to be limited to the DC electrical output for which system 85 may be configured. Rather, a single embodiment as reduced to practice has been shown and illustrated as one exemplary configuration. Additional or fewer inductor plates 70 may be configured within the high voltage electrical energy system 85 based on a desired DC electrical energy output. In this regard, the high voltage electrical energy system 85, in conjunction with the capacitance equations described hereinabove, provides a means for readily configuring the electrical energy system to deliver electrical energy as desired. Additionally, the inductor plates 70 themselves with their rectifier modules 75 are not intended to be limited to 25 kV DC output. Rather, the rectifier module 75 may be configured for rectifying the AC waveform and providing a different DC output based on the number of rectifier stages (e.g., rectifiers 90 of FIG. 8) within the rectifier module 75.

Figure 12:
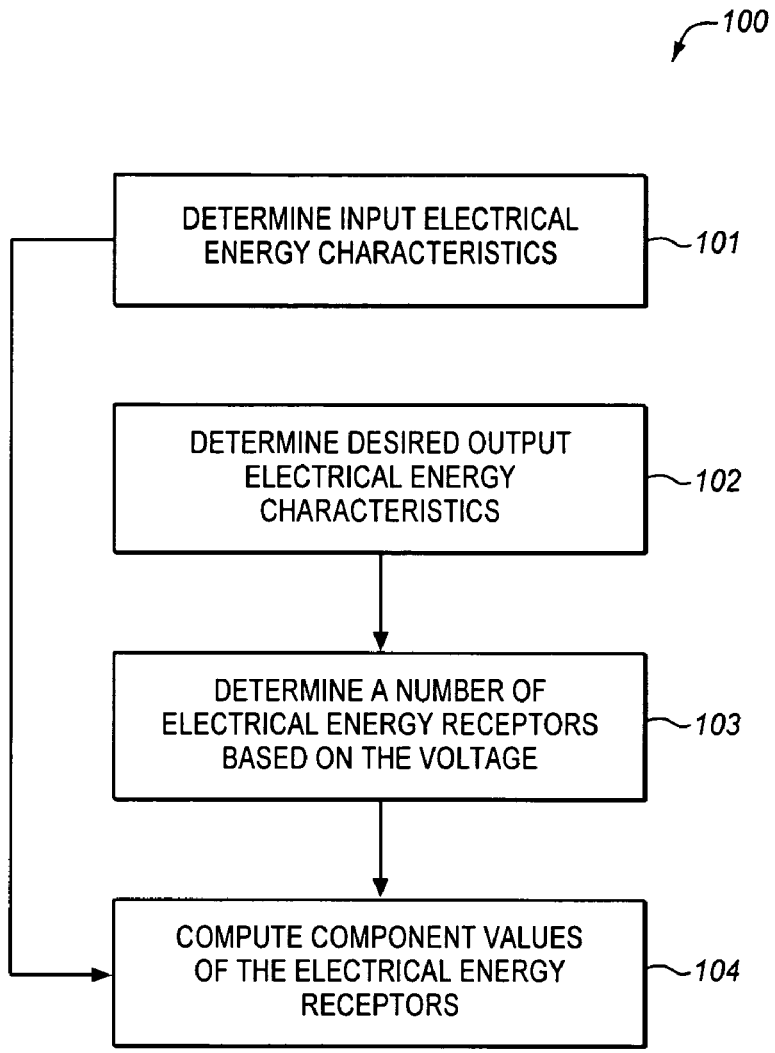
FIG. 12 is a flowchart of an exemplary process for configuring a high voltage electrical energy system.

FIG. 12 is a flowchart of an exemplary process 100 for configuring a high voltage electrical energy system, such as the high voltage electrical energy generation system 10 of FIG. 1. The process 100 initiates with the selection of an input signal to the electrical energy system, in the process element 101. In this regard, the characteristics of the electrical energy input may be determined. For example, the high voltage electrical energy system may be configured for receiving an AC signal so as to provide DC electrical energy having a voltage that is a multiple of the AC signal. Generally, any type of AC signal may be used, such as a sinusoidal waveform or a square wave.

Upon selecting the input signal, a determination is made regarding the desired characteristics of the output electrical energy, in the process element 102. For example, many applications (e.g., particle accelerators, Ion implanters, etc.) require a specific voltage for electrical energy, generally a very high voltage. Based on different techniques, technological advances in the application, etc., the high voltage electrical energy requirements may change for a given application. The embodiments shown and described hereinabove provide for a readily reconfigurable high voltage electrical energy system in which voltage output may be varied based on a number of electrical energy receptors (e.g., the electrical energy receptors 22 of FIG. 2). In this regard, the number of electrical energy receptors may be determined based on the voltage of the electrical energy to be provided, in the process element 103.

Having a number of electrical energy receptors coupled with the voltage that is to be provided, component values of the electrical energy receptors may then be computed, in the process element 104. For example, the electrical energy receptors may each be configured with an inductor to receive the electrical energy from a power source, such as the power source 21 of FIG. 2. The high voltage electrical energy system may then increase the voltage of the electrical energy from the power source for use in a desired application. To balance the electric field and provide a relatively flat voltage as described hereinabove, capacitor values (e.g., capacitors 27, 29, 31, and 33 of FIG. 2) are computed for configuration with these electrical energy receptors.

Although shown and described with respect to the computation of capacitor values to balance the output voltage of the electrical energy, the invention is not intended to be limited as such. Rather, the equations for computing the capacitor values described hereinabove may be reconfigured using predetermined capacitor values to compute inductor values (e.g., inductors 26, 28, 30, and 32 of FIG. 2) of the electrical energy receptors.

Any other combination of all the techniques discussed herein is also possible. The foregoing description has been presented for purposes of illustration and description. Furthermore, the description is not intended to limit the invention to the form disclosed herein. While a number of exemplary aspects and embodiments have been discussed above, those of skill in the art will recognize certain variations, modifications, permutations, additions, and sub-combinations thereof. It is therefore intended that the following appended claims and claims hereafter introduced are interpreted to include all such variations, modifications, permutations, additions, and sub-combinations as are within their true spirit and scope.

The invention claimed is:

1. An electrical energy generator, including:
a means for providing electrical energy; and
two or more electrical energy receptor modules inductively coupled to the means for providing the electrical energy and inductively coupled to each other, wherein the two or more electrical energy receptor modules incrementally increase a voltage thereof, and wherein a first receptor module relays the electrical energy to a second receptor module,
wherein the two or more receptor modules are operable to maintain a predetermined voltage level at a predetermined frequency of the input electrical energy,
wherein each receptor module has a capacitance that is adapted to maintain the predetermined voltage at an output of the electrical energy generator,
wherein the capacitance of the receptor modules is determined according to the following equation:

$$C_v = v_{cd}^{-1} M^{-1} \frac{1}{\omega^2} v_c,$$

wherein $C_v$ is a diagonal matrix of capacitor coefficients of the receptor modules, M is a square matrix of mutual inductances of the receptor modules, $\omega$ is the frequency of an input signal, $v_c$ is an Eigen vector of instantaneous voltages across capacitors of the receptor modules, and $v_{cd}$ is a diagonal matrix of the elements of the vector $v_c$.

2. The electrical energy generator of claim 1, wherein a first pair of the two or more electrical energy receptor modules has a first coefficient of coupling.

3. The electrical energy generator of claim 2, wherein a second pair of the two or more electrical energy receptor modules has a second coefficient of coupling that is substantially the same as the first coefficient of coupling.

4. The electrical energy generator of claim 1, wherein each of the two or more electrical energy receptor modules includes a circular configuration.

5. The electrical energy generator of claim 1, wherein each of the two or more electrical energy receptor modules are configured on plates that provide for selectable adjustment of the output electrical energy via the addition or removal of electrical energy receptor modules.

6. The electrical energy generator of claim 1, wherein each of the electrical energy receptor modules includes a rectifier for providing DC.

7. The electrical energy generator of claim 1, wherein the electrical energy generator is configured for providing greater than about 100 kV DC.

8. A method for configuring an electrical energy generator, including:
   determining a voltage for electrical energy to be provided; and
   configuring a plurality of electrical energy receptors to cooperatively provide the voltage for the electrical energy, wherein each receptor provides a portion of the overall voltage and wherein each is inductively coupled to one another,
   wherein configuring a plurality of electrical energy receptors includes configuring a capacitance value for each receptor,
   wherein configuring a capacitance value for each of the receptors includes determining mutual inductance values for the electrical energy receptors,
   wherein configuring a capacitance value for each of the electrical energy receptors further includes processing a plurality of matrix coefficients,
   wherein processing a plurality of matrix coefficients includes performing a matrix operation according to the following equation:

$$C_v = v_{cd}^{-1} M^{-1} \frac{1}{\omega^2} v_c,$$

wherein $C_v$ is a diagonal matrix of capacitor coefficients of the electrical energy receptors, M is a square matrix of mutual inductances of the electrical energy receptors, $\omega$ is the frequency of an input signal, $v_c$ is an Eigen vector of instantaneous voltages across the capacitors, and $v_{cd}$ is a diagonal matrix of the elements of the vector $v_c$.

9. The method of claim 8, wherein the input signal is AC electrical energy.

10. The method of claim 9, further including rectifying the AC electrical energy to provide DC electrical energy.

11. The method of claim 10, wherein rectifying the AC electrical energy includes staging rectification of the AC electrical energy with a plurality of rectifier stages.

12. The method of claim 11, further including providing the DC electrical energy from a first electrical energy receptor to a second electrical energy receptor.

13. The method of claim 12, further including providing the DC electrical energy from the electrical energy receptor to a third electrical energy receptor.

14. The method of claim 8, wherein configuring the plurality of electrical energy receptors includes providing a plurality of inductor plates in a stacked configuration.

15. A method for providing electrical energy, including:
   providing AC electrical energy;
   converting the AC electrical energy to a first DC electrical energy using a first electrical energy receptor;
   providing the first DC electrical energy to a second electrical energy receptor;
   converting the AC electrical energy to a second DC electrical energy using the second electrical energy receptor; and
   providing a third DC electrical energy based on the first and the second DC electrical energies, wherein the first electrical energy receptor and the second electrical energy receptor are coupled together via an inductive coupling,
   wherein providing the third DC electrical energy includes maintaining a relatively single voltage for the third DC electrical energy across a plurality of frequencies for the AC electrical energy,
   wherein maintaining a relatively single voltage for the third DC electrical energy includes computing capacitor values for the first and the second electrical energy receptors based on: a frequency of the AC; inductor values of the first and the second electrical energy receptors; a voltage of the AC electrical energy; or a combination thereof,
   wherein computing the capacitor values for the first and the second electrical energy receptors is determined according to the following equation:

$$C_v = v_{cd}^{-1} M^{-1} \frac{1}{\omega^2} v_c,$$

wherein $C_v$ is a diagonal matrix of capacitor coefficients of the electrical energy receptors, M is a square matrix of mutual inductances of the electrical energy receptors, $\omega$ is the frequency of an input signal, $v_c$ is an Eigen vector of instantaneous voltages across capacitors of the electrical energy receptors, and $v_{cd}$ is a diagonal matrix of the elements of the vector $v_c$.

16. The method of claim 15, wherein converting the AC electrical energy to a first DC electrical energy includes staging AC to DC electrical conversion using a plurality of rectifiers.

17. The method of claim 16, wherein the plurality of rectifiers are configured in series.

18. The method of claim 15, wherein the first electrical energy receptor and the second electrical energy receptor are coupled together via a DC to DC coupling.

19. The method of claim 15, wherein the first electrical energy receptor and the second electrical energy receptor receive the AC electrical energy via the inductive coupling.

20. The method of claim 15, further including providing a periodic inductive coupling with the first and the second electrical energy receptors.

* * * * *